U.S. Cl. 260—229

**3,631,023
CONTINUOUS ESTERIFICATION OF CELLULOSE**
Charles G. Horne, Jr., and Carl J. Howell, Jr., Charlotte, N.C., assignors to Celanese Corporation, New York, N.Y.
No Drawing. Filed Feb. 2, 1970, Ser. No. 8,028
Int. Cl. C08b 3/10, 3/30

12 Claims

ABSTRACT OF THE DISCLOSURE

Continuously esterified cellulose flake having a low standard derivation in viscosity, a low standard derivation in acetyl value and a low percentage of combined sulfates are produced by a continuous process comprising the following steps:

(1) slurrying cellulose in a lower fatty acid/water slurry;
(2) washing said slurry with lower fatty acid and extracting water from the cellulose slurry;
(3) adding an effective amount of an acid catalyst;
(4) mixing the pretreated cellulose containing the lower fatty acid and catalyst with a lower fatty acid/lower fatty acid anhydride mixture containing excess anhydride and esterifying the cellulose mixture;
(5) blending the esterified dope with an aqueous solution of neutralizing salt;
(6) desulfating the partially neutralized acetylated dope; and
(7) adding an aqueous neutralizing salt to the desulfated dope to stop all reactions.

BACKGROUND OF THE INVENTION

This invention relates to the manufacture of cellulose esters and, more particularly, to a continuous process for esterifying cellulose to produce a cellulose ester, such as cellulose triacetate.

The term "cellulose ester" is used herein to denote the lower alkyl esters of cellulose and especially esters of cellulose having between 1 and 4 carbon atoms in the ester moiety. The alkyl group in the ester chain may be acetate, a propionate, a butyrate, formate or mixtures thereof such as cellulose acetate formate, cellulose acetate propionate or cellulose acetate butyrate.

Cellulose esters, such as cellulose triacetate, are produced commercially almost exclusively by batch processes. There are several possible quality advantages of a continuous process over a batch process. Some of the major quality problems of the batch process are as follows:

(1) There is too long a period of time between the beginning and end of cellulose addition to the acetylizer because of the difficulty of discharging the fluffy cellulose from the batch pretreater which precedes the acetylizer. Further, since the batch acetylizers cannot be completely discharged at the end of a cycle, some cellulose remains in the acetylizer from one batch to another;
(2) It is not possible to provide intense agitation uniformly to all portions of the reacting mass in the acetylizer;
(3) There are inadvertent differences in process conditions between batch acetylizers in a production line;
(4) Inadequately pretreated cellulose which remains unreacted at the end of the batch acetylation is usually retained in the finished flake.

Gels, lower plugging values and a rather wide dispersion of acetyl value and intrinsic viscosity are the results of the inadequacies in a batch process. A properly designed continuous process offers means of overcoming these inherent quality defects to produce cellulose ester flake having the desired degree of esterification, viscosity and combined sulfates, as well as an extremely high plugging value.

The plugging value is a measure of the relative filterability of a cellulose ester in solution. It is related to filter press life in the plants under operating conditions. A 6 percent solution of the cellulose ester in a suitable solvent is prepared and filtered through a 30 ply Kimpak and Canton flannel at about 200 p.s.i.g. nitrogen pressure until the filter is plugged. The plugging value is defined as the grams of dry cellulose ester per square centimeter of filter area which can be filtered before blockage occurs.

Cellulose will react under anhydorus conditions, in the presence of a catalyst, with an aliphatic acid anhydride, such as acetic anhydride, to form a cellulose ester according to the following simplified equation:

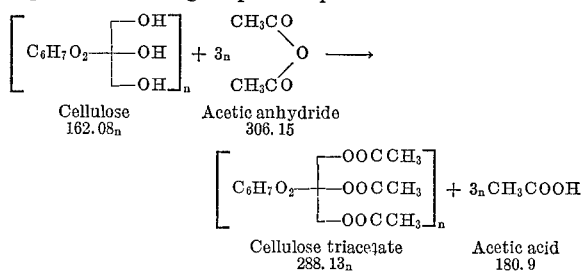

The fully acetylated cellulose acetate contains 44.8 percent combined acetyl or 62.5 percent, as combined acetic acid.

Specifically, this process is begun by charging acetylation grade cellulose, which has been shredded into small pieces, into an acetylator containing the bulk of the acetic acid and a small amount of catalyst, such as sulfuric acid. The cellulose is slowly agitated at about 100 degrees Fahrenheit for a period of about 1 hour or until it is thoroughly activated. Acetic anhydride which was previously cooled is then added, and the mixture is cooled to about 30 to 40 degrees Fahrenheit, which requires about 45 minutes, at which point the balance of the catalyst and a small amount of acetic acid are then added. The anhydride reacts with the water introduced by the cellulose, causing the temperature to rise sharply. The cellulose starts to acetylate, and the temperature is lowered to keep the reaction under control.

As the cellulose progressively reacts, the mass gradually turns from a thin, soupy mass into a heavy, doughy state from which it finally emerges as a clear, viscous honey-like solution. During this period, the temperature is usually allowed to rise to about 100 to 110 degrees Fahrenheit. After about 2 hours, the cellulose is almost completely acetylated and the reaction is continued only long enough after the temperature levels off to work out the last remaining fibers and to bring the solution to the desired viscosity. When this has been accomplished, the weak acid which furnishes the water for the hydrolysis is slowly added over about a 45 minute period as the solution is being vigorously agitated. The solution is then brought to about 100 degrees Fahrenheit and discharged into a hydrolysis vessel where it is kept at constant temperature until the desired number of acetyls have been removed. When the desired acetyl content has been reached, the solution is pumped slowly into a vessel along with about 10 to 15 weight percent acetic acid and recovered from a later stage of the operation, in such a ratio that the resulting mixture contains about 25 to 35 weight percent acetic acid.

The mixture is vigorously agitated during this stage and, as a result, the cellulose acetate separates from the solution as a flaky solid. The slurry is dropped continuously into a preliminary washer where the 25 to 35 weight percent acid is drained off and pumped to a recovery system. The solid cellulose acetate is then washed with a controlled amount of water until the acidity is reduced to about 0.1 percent, as acetic acid. The cellulose ester and water slurry is pumped through a final washing tank where it is washed with water until substantially free of acid.

Stabilizing salts, frequently the carbonates or hydroxides of calcium, magnesium or sodium, are then added and the cellulose acetate is pumped in slurry form to a dehydrating machine. Herein the moisture content is reduced to about 50 to 75 weight percent and the flake is afterwards shredded to break up the lumps and conveyed to an air dryer, where it is dried at about 225 to 275 degrees Fahrenheit to less than about 1 weight percent moisture content. It is then conveyed to storage for use in the textile solution-making operation.

In addition to containing acetyl and hydroxyl groups, commercial cellulose acetate contains small amounts of free carboxyl and acid sulfate groups. Acid sulfate groups arise from the use of sulfuric acid as a catalyst for the acetylation reaction. They are substantially removed during hydrolysis, though never entirely, and have a decided influence on the inherent stability of the cellulose acetate, especially to heat and boiling water. The acid groups are of importance because they combine with metallic salts sometimes present in the wash water and cause artificially high viscosity when the cellulose acetate is dissolved in solvents.

Almost any plant that grows contains sufficient cellulose to be utilized as a source of chemical cellulose. Formerly, cellulose utilized for acetylation to produce cellulose esters suitable for forming filaments was obtained chiefly from purified cotton linters, the short cotton fibers cut from the cotton seed after the removal of the long fibers by a cotton gin. More recently, wood pulp having a high alpha-cellulose content has become the dominant raw material. The purified cellulose or wood pulp must be relatively free of hemicelluloses, which are chiefly pentosans and polysaccharides, such as mannans and xylans, which may contribute to serious thixothropy, and free of oxycelluloses, which may form metallic salts that could cause orifice blockage. Alpha-cellulose is a technical term for the portion of wood pulp that is insoluble in alkali of mercerizing strength (17.5 percent). The soluble portion comprises the hemicelluloses, polysaccharides, oxycelluloses and lower molecular weight substances. Wood pulps having an alpha-cellulose content of from about 96 to 98 weight percent are satisfactory materials for this end use.

Aliphatic esters other than cellulose ester are also made. They are made in much the same general manner as the acetate esters except that another acid such as butyric or propionic acid is substituted for all or part of the acetic acid and acetic anhydride.

OBJECTS OF THE INVENTION

It is an object of the present invention to provide a continuous process for the esterification of cellulose which results in a continuously uniform product having a minimum variation in the degree of esterification, uniform viscosity, a high plugging value and low combined sulfates.

It is a further object of this invention to provide a process for the continuous esterification of wood pulp having a lower alpha-cellulose content than was heretofore throught useable and producing flake for the production of cellulose ester filaments.

It is still another object of this invention to provide a continuous process for the production of cellulose triester flake of superior quality and/or at lower cost due to the utilization of lower cost wood pulp.

It is another object of this invention to provide cellulose ester flake of higher plugging value than was heretofore possible.

Further objects of the present invention will become apparent hereinafter.

SUMMARY OF THE INVENTION

The continuous esterification process of the present invention comprises the following steps:

(1) Cellulose is slurried in a lower fatty acid/water slurry containing from about 70 to 95 weight percent lower fatty acid and from about 5 to 30 weight percent water, wherein the lower fatty acid is a $C_1$ to $C_4$ monocarboxylic acid and mixtures thereof.

(2) Water is extracted from the cellulose slurry and the cellulose deliquored prior to esterification to prevent excessive anhydride consumption. The slurry is metered to an extractor and washed with from about 2 to 5 pounds of lower fatty acid per pound of cellulose. Residence time in the extractor ranges from about 2 to 10 minutes. Cellulose leaves the extractor and is deliquored to about 30 to 50 weight percent consistency and from about 2 to 5 weight percent water, based on the weight of the cellulose.

(3) The cellulose is preferably fluffed and a catalyst is blended therein. Any strong mineral acid such as sulfuric, perchloric, nitric or hydrochloric is an effective catalyst. From about 5 to 10 weight percent, based on the weight of the cellulose, of the catalyst is added to the cellulose.

(4) Pretreated cellulose containing the lower fatty acid and catalyst is mixed with a lower fatty acid/lower fatty acid anhydride mixture containing about 10 to 30 weight percent exces anhydride. The cellulose mixture is esterified for from about 20 to 50 minutes with a gradually increasing temperature profile ranging from about 14 to 55 degrees centigrade.

(5) Esterified dope from the reactors is then thoroughly and rapidly blended with an aqueous solution of a neutralizing salt, such as carbonates, hydroxides, oxides or acetates of calcium, magnesium, barium, iron, aluminium and zinc, preferably magnesium acetate or zinc acetate. This reduces the acid catalyst concentration to less than 3 weight percent, based on the weight of the cellulose.

(6) The partially neutralized esterified dope is then allowed to react to split off combined anionic groups, e.g., sulfates, nitrates, perchlorates and chlorides.

(7) Aqueous neutralizing salt, such as magnesium acetate or zinc acetate, is added to the dope to stop all reactions.

(8) Conventional continuous flake finishing is then used for the continuously acetylated dope, i.e., the flake is precipitated, washed, dried and stored for use in formulating filament-forming solutions, as desired.

After finishing, the continuously esterified flake is solutioned in a suitable solvent preparatory to the spinning operation. The continuously esterified flake of this invention has a higher plugging value than flake that has heretofore been produced, a narrow standard deviation in viscosity and, preferably, a narrow standard deviation in acetyl value. These improved properties result in a more uniform product and improved spinning metier stability.

A good indication of the uniformity of yarn is the level of dye streakiness, which is extremely low for yarn produced from the continuously acetylated flake of this invention. A high plugging value means beter filterability which results in longer filter life and improved stability in the spinning metier.

The continuously esterified flake of this invention has a plugging value of from about 150 to about 230 grams per square centimeter, preferably 160 to 220 grams per square centimeter; a standard deviation in viscosity of less than about 8 centipoises, preferably less than about 5 centipoises. Preferably the flake also has a standard deviation in the degree of esterification, expressed as the combined lower fatty acid, of less than about .20 percent, preferably less than about .15 percent; and a level of acid catalyst salts of less than about 0.03 weight percent, preferably from about 0 to about 0.025 weight percent. The most preferred flake is cellulose triacetate, wherein the degree of esterification is expressed as the acetyl value, preferably about 61.7 percent, expressed as combined acetic acid.

The viscosity of a liquid is a measure of its internal friction and if the liquid is a solution of high polymer material, the viscosity is an indication of the molecular weight. It is important that the viscosity of cellulose ester flake be within specified limits to obtain a uniform material for spinning yarn. The 6 percent viscosity of a solution of esterified cellulose flake is measured by timing the flow through a calibrated viscometer of a solution containing about 6 weight percent cellulose ester in a solvent, preferably 91/9 weight percent methylene chloride/methanol for cellulose triacetate.

The viscosity of the continuously esterified cellulose flake is determined at the end of each eight hour shift. Thus, three measurements a day are taken and the standard deviation in viscosity is less than about 8 centipoises, preferably less than about 5 centipoises. The samples tested for viscosity are composite of eight hourly samples.

The sulfate content of cellulose triacetate should be controlled at a minimum value because of the effect of these sulfates on the stability, dyeing and extrusion characteristics. The sample is treated with hot 0.07 weight percent hydrochloric acid in a steam autoclave to splitt off bound sulfate groups. These, together with the soluble sulfate salts, are leached out and determined gravimetrically after precipitation with barium chloride. Results are reported as percent sulfate, $SO_4$, by weight.

DESCRIPTION OF THE PREFERRED EMBODIMENTS

In a preferred embodiment, the continuous esterification process of the present invention comprises the following steps:

(1) Cellulose is slurried by hydropulping at about 1.5 to 4.0 weight percent consistency in an acetic acid/water slurry containing from about 70 to 95 weight percent acetic acid and from about 5 to 30 weight percent water. The wood pulp is hydropulped for from about 3 to 20 minutes and discharged into a slurry tank.

(2) Water is extracted from the cellulose slurry and the cellulose deliquored prior to acetylation to prevent excessive anhydride consumption. The slurry is then washed with from about 2 to 5 pounds of glacial acetic acid per pound of cellulose. Residence time in the extractor ranges from about 2 to 10 minutes, preferably under a vacuum of from about 5 to 15 inches of mercury. Cellulose leaves the extractor at a consistency of from about 13 to 20 weight percent and contains from about 6 to 12 weight percent water, based on the weight of the cellulose. The cellulose is deliquored to about 30 to 50 weight percent consistency and from about 2 to 5 weight percent water, based on the weight of the cellulose, by subjecting the cellulose to a drying procedure, such as by utilizing a centrifuge having a centrifugal force from about 1200 to 1800 gravities for from about 1.5 to 7 seconds.

(3) The cellulose is preferably fluffed and a catalyst (preferably sulfuric acid) is uniformly blended in. From about 5 to 10 weight percent, based on the weight of the cellulose, of a catalyst, such as sulfuric acid, is preferably added to glacial acetic acid (from about 0.5 to 2 pounds per pound of cellulose). Preferably, this mixture is then blended into the cellulose.

(4) Pretreated cellulose containing acetic acid and catalyst is mixed with A-mix (from about 35 to 70 weight percent acetic anhydride and 30 to 65 weight percent acetic acid) which has been preferably precooled to about 1 to 25 degrees centigrade. About 10 to 30 weight percent excess anhydride over that required to acetylate the cellulose is used in the initial startup. Residence time in the acetylizers is from 20 to 50 minutes with a gradually increasing temperature profile ranging from 14 to 55 degrees centigrade, preferably from about 23 to 46 degrees centigrade. Two acetylizers, in series, are preferably used and ideally have from about 15 to 25 theoretical stages to insure uniform residence time history.

(5) Acetylated dope from the reactors is then thoroughly and rapidly blended with an aqueous solution of a neutralizing salt, preferably magnesium acetate or zinc acetate. The sulfuric acid concentration is reduced to less than 3 weight percent, preferably from about 1.5 to about 2 weight percent, based on the weight of the cellulose.

(6) The partially neutralized acetylated dope is then desulfated.

(7) Aqueous neutralizing salt, preferably magnesium acetate or zinc acetate, is added to the desulfated dope to stop all reactions. It is often preferred to utilize up to 5 weight percent excess of the neutralizing salt to insure that all the catalyst is neutralized.

(8) Conventional continuous flake finishing is then used for the continuously acetylated dope.

It will be understood by those skilled in the art that other $C_1$–$C_4$ lower fatty acids and anhydrides or other strong mineral acid catalysts can be utilized in the above process with equivalent results.

In a more preferred embodiment, the continuous esterification process of the present invention comprises the following steps:

(1) Cellulose is slurried by hydropulping at about 2 to 3 weight percent consistency in an acetic acid/water slurry containing from about 75 to 85 weight percent acetic acid and from 15 to 25 weight percent water. The wood pulp is hydropulped for from about 3 to 7 minutes and discharged into a slurry tank.

(2) Water is extracted from the cellulose slurry and the cellulose deliquored prior to acetylation to prevent excessive anhydride consumption. The slurry is metered to an extractor and washed with from about 2 to 3.5 pounds of glacial acetic acid per pound of cellulose. Residence time in the extractor ranges from about 2 to 5 minutes, preferably under a vacuum of from about 5 to 10 inches of mercury. Cellulose leaves the extractor at a consistency of from about 13 to 17 weight percent and contains from about 8 to 11 weight percent water, based on the weight of the cellulose, and is deliquored to about 35 to 45 weight percent consistency and from about 2 to 4 weight percent water, based on the weight of the cellulose, by subjecting the cellulose to a drying procedure, such as by utilizing a centrifuge having a centrifugal force from about 1400 to 1600 gravities for from about 3 to 5 seconds.

(3) The cellulose is fluffed and a sulfuric acid catalyst, diluted in glacial acetic acid, is uniformly blended in the second stage pretreater. From about 6 to 8 weight percent, based on the weight of the cellulose, of the catalyst, is added to glacial acetic acid present in an amount from about 0.75 to 1.25 pounds per pound of cellulose.

(4) Pretreated cellulose containing acetic acid and catalysts is mixed with A-mix (from about 40 to 60 weight percent acetic anhydride and 40 to 60 weight percent acetic acid) which has been preferably precooled to about 3 to 10 degrees centigrade in the first section of the first acetylizer. Approximately 15 to 25 weight percent excess acetic anhydride over that required to acetylate the cellulose is used in the initial startup. However, excess anhydride can be reduced when the operation stabilizes. Residence time in the acetylizers is from about 25 to 35 minutes with a gradually increasing temperature profile ranging from about 23 to 46 degrees centigrade. Two acetylizers, in series, are used and ideally have about 20 theoretical stages to insure uniform residence time history.

(5) Acetylated dope from the reactors is then thoroughly and rapidly blended with an aqueous neutralizing salt, preferably magnesium acetate or zinc acetate. The sulfuric acid concentration is reduced to from about 1.5 to about 2 weight percent, based on the weight of the cellulose.

(6) The partially neutralized acetylated dope is then desulfated for from about 40 to 50 minutes at a temperature of from about 50 to 60 degrees centigrade. Desulfation is the reaction between water and combined sulfates in the cellulose triacetate flake. Water is in excess and is the driving force. Temperature and sulfuric acid are the catalysts in the reaction which produces cellulose and sulfuric acid.

(7) Aqueous neutralizing salt, preferably magnesium acetate or zinc acetate, is added to the desulfated dope to stop all reactions. About 5 weight percent excess of the neutralizing salt is used to insure that all the catalyst is neutralized.

(8) Conventional continuous flake finishing is then used for the continuously acetylated dope.

The continuous esterification process of this invention utilizes:

(1) A cellulose pretreatment in a liquid slurry mixture, high water concentration during activation and subsequent controlled extraction of water and some detrimental cellulosic material.

(2) The esterification catalyst catalyzes a uniform esterification reaction because: (a) in the continuous process there is substantially no time lag in uniformly blending all of either the catalyst or the esterification mixture into the pretreated cellulose, and (b) temperature control is maintained within narrow limits.

(3) In the subsequent steps, e.g., desulfation and neutralization, there is again substantially no time lag in the addition of the materials as well as good temperature control.

In the process of this invention, it is extremely important that the temperature during the various steps of the process be controlled within narrow limits to insure a uniform product. Therefore, while the temperature conditions may be chosen within the ranges previously set forth, the temperature during each process step, once set, must be controlled to within about 3 degrees centigrade of the set temperature or temperature profile, preferably within about 1 degree centigrade.

The continuous process of this invention allows one to accurately control temperature because there is enough heat transfer area in relation to the volume of the mass whose temperature is being controlled. This is in contrast to a batch-type process where the heat transfer area of the kettle-like reactor is small compared with the volume of the batch.

Thus, the use of plural continuous esterifiers, e.g., 2 acetylizers each having multi-stages, permits accurate control of the temperature profile during esterification, i.e., accurate control at the beginning and end of each stage to within 3 degrees centigrade of the desired temperature. This accurate control is such that any given group of particles in the esterified cellulose flake will have a substantially uniform temperature history.

These combined improvements over a batch process result in producing an improved quality flake having about half the viscosity variability and about 3 times the plugging value, as well as improved spinning metier stability.

The invention is further illustrated by the following examples. All percentages are by weight and all temperatures are in degrees centigrade, unless otherwise specified.

EXAMPLE I

Wood pulp having an alpha-cellulose content of about 97 weight percent was slurried by hydropulping at about 2.5 percent by weight consistency in 80/20 weight percent acetic acid/water slurry for about 5 minutes and discharged into a slurry tank. Water was removed from the mixture by continuous countercurrent extraction of water from the slurry with glacial acetic acid in a 12-stage extractor. The slurry was countercurrently washed with about 2.9 pound glacial acetic acid per pound of cellulose for about 3 minutes. A vacuum of about 8 inches of mercury was utilized to draw the liquid from the slurry, forming a cellulose cake having about 15 weight percent consistency and about 9.3 weight percent water, based on the weight of the cellulose. The cellulose cake was then deliquored to about 39.5 weight percent consistency and about 2.5 weight percent water, based on the weight of the cellulose, by subjecting it to about 1500 gravities centrifugal force for about 3 to 5 seconds in a centrifuge.

The cellulose was fluffed; 7.1 weight percent, based on the weight of the cellulose, of sulfuric acid was added to one pound of glacial acetic acid per pound of cellulose and mixed with the centrifuged cellulose for about 2 to 3 seconds. This pretreated cellulose was then mixed with a mixture containing about 43 weight percent acetic anhydride and about 57 weight percent acetic acid which had been cooled to about 3 degrees centigrade. About 20 weight percent excess acetic anhydride over that required to fully acetylate the cellulose was used in the startup. The cellulose was acetylated for approximately 30 minutes with a gradually increasing temperature profile from about 23 degrees centigrade to 46 degrees centigrade. The two acetylizers, in series, had approximately 20 theoretical stages which insured substantially uniform residence time history. Acetylated dope from the reactors was rapidly blended with aqueous magnesium acetate (about 21 weight percent solution in water). This reduced the sulfuric acid concentration to about 2 weight percent, based on the weight of the cellulose.

The partially neutralized acetylated dope was desulfated in a cooled, 15-stage column for about 45 minutes at a temperature of about 55 degrees centigrade. An excess of about 5 percent magnesium acetate was added to the dope to insure that all the catalyst was neutralized and to stop all reactions. The dope was then precipitated, washed and dried to yield cellulose triacetate flake.

The continuously acetylated flake had an acetyl value of about 61.7 percent, a plugging value of about 220 grams per square centimeter, an I.V. of about 2 deciliters per gram, a viscosity of about 95 centipoises, a viscosity standard deviation of about 4.5 (48 samples), a moisture content of about 2 weight percent, an acidity of about 0.003 weight percent, and total sulfates of about 0.025 weight percent.

The free sulfuric acid concentration at the start of desulfation in Example I was controlled at three levels with the following results:

TABLE I.—EFFECT OF SULFURIC ACID CONCENTRATION DURING DESULFATION

| Free sulfuric acid concentration, percent by weight of cellulose | $n$ | Viscosity, cps. | Total sulfates, percent by weight |
|---|---|---|---|
| 1.6 | 3 | 148 | 0.017 |
| 3.1 | 3 | 94 | 0.020 |
| 4.8 | 3 | 63 | 0.048 |

These data indicate that the sulfuric acid concentration at the start of desulfation has a major effect on viscosity. Reducing the sulfuric acid concentration to less than about 3 weight percent enables the lowering of the viscosity at the end of acetylation in producing flake having target viscosity, e.g., at least 95 centipoises. The lower viscosity at the end of acetylation is obtained by slightly raising acetylation temperatures which leads to substantially improved plugging value and easier reactor temperature control.

EXAMPLE II

Nitration grade wood pulp having an alpha-cellulose content of about 92 to 93 weight percent was continuously acetylated according to the procedure set forth in Example I.

The continuously acetylated flake had an acetyl value of about 61.7 percent, a plugging value of about 80 grams per square centimeter, an I.V. of about two deciliters per gram, a viscosity standard deviation of about 5 centipoises (45 samples), a moisture content of about 2 weight percent, an acidity of less than about 0.003 weight percent and total sulfates of about 0.025 weight percent.

EXAMPLE III

Wood pulp having an alpha-cellulose content of about 97 weight percent and having a moisture content of about 5 percent was sprayed with glacial acetic acid for about 2 minutes to about a 70 percent by weight consistency. The treated cellulose was then mixed with about 7 weight percent sulfuric acid, based on the weight of the cellulose. To this was added 600 weight percent, based on the weight of the cellulose, of a mixture containing about 60 weight percent acetic acid and 40 weight percent acetic anhydride, which had been cooled to about 2 degrees centigrade. This mixture was then cooled to about −10 degrees centigrade and put into an acetylizer where acetylation takes place for about 110 minutes during which the temperature peaks at about 48 degrees centigrade.

About 45 minutes after reaching th peak temperature, the acetylated dope was mixed with 25 weight percent, based on the weight of the cellulose, of a mixture containing about 1 weight percent acetic acid, about 20 weight percent magnesium acetate and about 79 weight percent water to reduce the sulfuric acid level to about 3 weight percent, based on the weight of the cellulose.

The partially neutralized acetylated dope was then put into the desulfator and desulfated at about 50 degrees centigrade for about 60 minutes by adding about 14 weight percent, based on the weight of acetylated cellulose, of a mixture containing about 10 weight percent magnesium acetate, 40 weight percent water and about 50 weight percent acetic acid. This insured that the catalyst was neutralized and stopped the reaction. The dope was then precipitated, washed and dried to yield batch process cellulose triacetate flake.

The batch process flake had an acetyl value of about 61.7 percent, a plugging value of about 64 grams per square centimeter, an I.V. of about two deciliters per gram, a viscosity of about 93 centipoises, a viscosity standard deviation of greater than 9 (227 samples), a moisture content of about 2 weight percent, an acidity of about 0.003 weight percent and total combined sulfates of about 0.025 weight percent.

The above batch produces esterified cellulose having plugging values of from about 50 to 75 grams per square centimeter and a viscosity standard deviation of 9 or more, typically 9 to 11 centipoises.

EXAMPLE IV

The cellulose triacetate flakes of Examples II and III were each solutioned in 91/9 weight percent methylene chloride/methanol and spun under the same conditions at 750 meters per minute. The results of this comparative spinning are shown in Table II below:

TABLE II

|  | 93% $\alpha$-cellulose based continuous process flake of Example II | | 97% $\alpha$-cellulose based batch process flake of Example III | |
|---|---|---|---|---|
|  | Avg. | N | Avg. | N |
| Denier, g./9,000 m | 54.20 | 45 | 53.80 | 10 |
| Instron tenacity, g./d | 1.21 | 45 | 1.24 | 10 |
| Instron elongation, percent | 23.00 | 45 | 22.70 | 10 |
| Residual solvents, percent | 20.82 | 9 | 20.17 | 12 |
| Extrusion stability, percent shorts | 3.90 | 1,400 | 8.00 | 1,700 |
| Fil denier range, denier | 0.60 | 45 | 0.45 | 50 |

Continuous process flake based on 93 percent alpha-cellulose nitration grade wood pulp had a higher plugging value and lower extrusion shorts compared to batch process 97% alpha-cellulose wood pulp based flake.

EXAMPLE V

Cellulose triacetate flake produced by Examples I and III was solutioned in 91/9 weight percent methylene chloride/methanol and extruded at both 750 meters per minute and 650 meters per minute. The extrusion data and properties of the yarn produced is summarized in Table III below:

TABLE III.—EXTRUSION PERFORMANCE OF YARN MADE FROM EXAMPLES I AND III

|  | Continuous process flake based yarn (flake of Ex. I) | | Batch flake based yarn (flake of Ex. III) | |
|---|---|---|---|---|
|  | Avg. | N | Avg. | N |
| 75 denier/20 fil at 750 m./min.: | | | | |
| Denier, g./9,000m | 74.20 | 30 | 73.40 | 40 |
| Instron tenacity, g./d | 1.22 | 30 | 1.21 | 40 |
| Instron elongation, percent | 25.00 | 30 | 24.50 | 40 |
| Residual solvents, percent | 21.36 | 9 | 20.68 | 6 |
| Shorts, percent | 7.20 | 696 | 10.70 | 624 |
| Fil denier range, den | 0.36 | 14 | 0.50 | 30 |

Filling band trials using dull cellulose triacetate and warp trials using 75 denier/20 fil dull cellulose triacetate indicated that the continuous process based yarn produced from the flake of Example I was significantly less streaky after dyeing than the batch process based yarn produced from the flake of Example III. Other properties such as heat-set properties, fading, light fastness and wash fastness were equivalent.

The accurate temperature control, especially during acetylation in combination with the lack of time lag of a continuous process results in an extremely uniform product. This uniform, controlled procedure results in an improved product and, perhaps more importantly, enables the production of satisfactory esterified cellulose flake having a plugging value of from about 80 to 100 grams per square centimeter and a viscosity standard deviation of less than about 8 centipoises from heretofore unuseable wood pulp; i.e., having an alpha-cellulose content of from about 92 to 93 weight percent.

What we claim is:
1. A continuous process for the esterification of cellulose comprising the following steps:
    (1) slurrying cellulose in a lower fatty acid/water slurry containing from about 70 to 95 weight percent lower fatty acid and from about 5 to 30 weight percent water, wherein the lower fatty acid comprises at least one $C_1$ to $C_4$ monocarboxylic acid;
    (2) washing said slurry with from about 2 to 5 pounds of lower fatty acid per pound of cellulose and extracting water from the cellulose slurry to about 30 to 50 weight percent consistency and from about 2 to 5 weight percent water, based on the weight of the cellulose;
    (3) adding an effective amount of an acid catalyst;
    (4) mixing the pretreated cellulose containing the lower fatty acid and catalyst with a lower fatty acid/lower fatty acid anhydride mixture containing about 10 to 30 weight percent excess anhydride and esterifying the cellulose mixture for from about 20 to 50 minutes, gradually increasing temperature profile ranging from about 14 to about 55 degrees centigrade;
    (5) blending the esterified dope with an aqueous solution of a neutralizing salt and reducing the acid catalyst concentration to less than about 3 weight percent, based on the weight of the cellulose;
    (6) splitting off combined anionic groups from the partially neutralized esterified dope; and
    (7) stopping the reactions by adding an aqueous neutralizing salt.
2. The process of claim 1 wherein the acetylation step is a multi-stage esterification wherein the temperature at each stage is controlled to within about 3 degrees centigrade of the desired temperature.
3. The process of claim 1 wherein the acid catalyst concentration after addition of the neutralizing salt in step (5) is reduced to from about 1.5 to 2 percent, based on the weight of the cellulose.

4. The process of claim 1 wherein the lower fatty acid is acetic acid, the acid catalyst is sulfuric acid and the acetylated dope is allowed to desulfate in step (6).

5. A continuous acetylation process comprising the following steps:
   (1) slurrying cellulose by hydropulping at about 1.5 to 4.0 weight percent consistency in an acetic acid/water slurry containing from about 70 to 95 weight percent acetic acid and from about 5 to 30 weight percent water for from about 3 to 20 minutes;
   (2) washing the slurry with from about 2 to 5 pounds of glacial acetic acid per pound of cellulose, extracting water from the cellulose slurry for from about 2 to 10 minutes to a consistency of from about 13 to 20 weight percent and from about 6 to 12 weight percent water, based on the weight of the cellulose, and drying the cellulose to about 30 to 50 weight percent consistency and from about 2 to 5 weight percent water, based on the weight of the cellulose;
   (3) blending in from about 5 to 10 weight percent, based on the weight of the cellulose, of an acid catalyst;
   (4) mixing the cellulose containing acetic acid and catalyst with a mixture containing from about 35 to 70 weight percent acetic anhydride and 30 to 65 weight percent acetic acid, said mixture containing from about 10 to 30 weight percent excess anhydride over that required to acetylate the cellulose, and acetylating the mixture for from 20 to 50 minutes with a gradually increasing temperature profile ranging from 14 to 55 degrees centigrade;
   (5) blending the acetylated dope with an aqueous solution of a neutralizing salt and reducing the sulfuric acid concentration to less than about 3 weight percent, based on the weight of the cellulose;
   (6) desulfating the partially neutralized acetylated dope; and
   (7) adding an aqueous neutralizing salt to the desulfated dope to stop all reactions.

6. The process of claim 5 wherein the acetylation step is a multi-stage esterification wherein the temperature at each stage is controlled to within about 3 degrees centigrade of the desired temperature.

7. The process of claim 5 wherein the acid catalyst concentration after addition of the neutralizing salt in step (5) is reduced to from about 1.5 to 2 percent, based on the weight of the cellulose.

8. The process of claim 5 wherein prior to the addition of the sulfuric acid in step (3), the sulfuric acid is diluted with from about 0.5 to 2 pounds per pound of cellulose of glacial acetic acid.

9. The process of claim 6 wherein the acetylation is carried out with a gradually increasing temperature profile ranging from about 23 to 46 degress centigrade.

10. The process of claim 5 wherein a cellulose-containing wood pulp having an alpha-cellulose content of from about 92 to 93 percent is acetylated to produce acetylated cellulose flake having a plugging value of at least 80 grams per square centimeter and a standard deviation in viscosity of 5 centipoises or less.

11. A continuous acetylation process comprising the following steps:
   (1) slurrying cellulose by hydropulping at about 2 to 3 weight percent consistency in an acetic acid/water slurry containing from about 75 to 85 weight percent acetic acid and from 15 to 25 weight percent water for from about 3 to 7 minutes;
   (2) metering the slurry to an extractor and washing with from about 2 to 3.5 pounds of glacial acetic acid per pound of cellulose from about 2 to 5 minutes under a vacuum of from about 5 to 10 inches of mercury, to a consistency of from about 13 to 17 weight percent and containing from about 8 to 11 weight percent water, based on the weight of the cellulose, and drying the cellulose to about 35 to 45 weight percent consistency and from about 2 to 4 weight percent water, based on the weight of the cellulose;
   (3) adding from about 6 to 8 weight percent, based on the weight of the cellulose, of a sulfuric acid catalyst to glacial acetic acid present in an amount from about 0.75 to 1.25 pounds per pound of cellulose and blending the catalyst mixture into the cellulose;
   (4) mixing the cellulose containing acetic acid and catalyst with a mixture containing from about 40 to 60 weight percent acetic anhydride and 40 to 60 weight percent acetic acid which has been precooled to about 3 to 10 degrees centigrade, and acetylating the cellulose mixture for from about 25 to 35 minutes, with a gradually increasing temperature profile ranging from about 23 to 46 degrees centigrade;
   (5) rapidly blending the acetylated dope with an aqueous neutralizing salt and reducing the sulfuric acid concentration to from about 1.5 to about 2 weight percent, based on the weight of the cellulose;
   (6) desulfating the partially neutralized acetylated dope for from about 40 to 50 minutes at a temperature of from about 50 to 60 degrees centigrade; and
   (7) adding an aqueous neutralizing salt to the desulfated dope to stop all reactions.

12. The process of claim 11 wherein the acetylation step is a multi-stage esterification wherein the temperature at each stage is controlled to within about 3 degrees centigrade of the desired temperature.

References Cited

UNITED STATES PATENTS

| | | | |
|---|---|---|---|
| 2,478,383 | 8/1949 | Fordyce et al. | 260—229 |
| 2,603,638 | 7/1952 | Seymour et al. | 260—229 |
| 2,607,771 | 8/1952 | Groombridge et al. | 260—227 |
| 2,772,944 | 12/1956 | Allenwelt | 260—229 |
| 2,801,237 | 7/1957 | Clevy et al. | 260—227 |
| 2,854,446 | 9/1958 | Robin et al. | 260—229 |
| 2,966,485 | 12/1960 | Laughlin et al. | 260—227 |

DONALD E. CZAJA, Primary Examiner

R. W. GRIFFIN, Assistant Examiner

U.S. Cl. X.R.

106—196; 260—227